3,281,569
CONTACT ROLLER FOR SEAM WELDING MACHINES
Willy Bachofner, Zurich, Switzerland, assignor to H. A. Schlatter AG, Zollikon, Zurich, Switzerland
Filed Apr. 6, 1964, Ser. No. 357,601
Claims priority, application Switzerland, Aug. 5, 1963, 9,669/63
5 Claims. (Cl. 219—84)

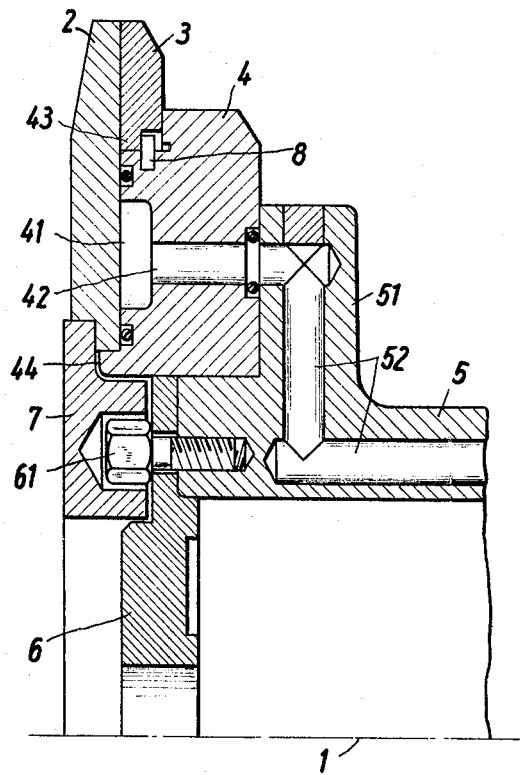

The invention relates to a contact roller, for seam welding machines, which incorporates a cooling duct. This type of contact roller is suitable, for example, for progressive seam welding or synchronous seam welding. It may be the driving roller or the loose roller of a pair of contact rollers, a stationary contact roller in a seam welding machine incorporating work-piece slides, a travelling electrode or an eccentrically-driven contact roller in a welding machine for producing annular seams.

The rolling surface of such a contact roller is subject to wear during operation, and cracks appear in the rolling surface. For this reason, that part exhibiting the rolling surface, that is to say that part consisting of electrode material, must be regularly turned on a lathe after certain operating periods in order to maintain a smooth, even rolling surface, and eventually the roller must be replaced. In conventional contact rollers, this part is a hollow body whose cavity serves as a cooling duct. The costs of producing such hollow bodies are comparatively high.

The contact roller of the invention has a ring of electrode material which is adjacent an annular member which has an annular groove in its surface adjacent said ring, which groove forms the cooling duct. Since the ring of electrode material does not contain the cooling duct nor, consequently, its inlet and outlet lines for the cooling medium, it can be of a very simple shape, for example, in the form of a flat annulus. Its production costs are therefore correspondingly reduced. Only the said annular part containing the cooling duct has a more complicated structure. This member is not subject to wear during operation, however, and so need not be replaced. Moreover, its shape is no more complicated than that of the conventional hollow parts of electrode material. Thus, the contact roller of the invention is not substantially more expensive to produce than conventional contact rollers and has the advantage that its maintenance costs are much lower, as the part which is subject to wear and must be regularly replaced is of a very simple shape.

A preferred embodiment of the invention is shown in the accompanying drawing, which represents a radial section through a contact roller.

The contact roller shown is of the kind in which the rolling surface is formed by the peripheral surface of a ring of electrode material and that of a further ring which conducts substantially no welding current. The drawing shows only that part of the contact roller above its geometrical axis 1. Reference numeral 2 designates the ring consisting of electrode material (electrode bronze) and reference numeral 3 designates the annualar member which conducts substantially no welding current. The latter is made of a non-magnetic material whose specific electric resistance is substantially greater than that of the electrode material, so that current flowing therethrough does not affect the welding operation. A material with such properties is, for example, the alloy obtainable commercially under the trademark Inconel.

The ring 2 is adjacent an annular member 4 which has an annular groove 41 in its surface adjacent the ring 2, which groove forms the cooling duct. This cooling duct is closed by the ring 2 on its left-hand side as viewed in the drawing. The ring 4 is secured to a flange 51 of the hub 5 of the contact roller in a manner not shown (for example, by means of screws).

The annular member 4 and the hub 5 have bores 42, 52. These form part of an admission line for the cooling medium, usually water, which is passed through the cooling duct 41, to further bores (not shown) forming the outlet line.

An annulus 6 mounted on a driving shaft (not shown) is secured to the hub 5 by means of screws 61. The hub 5 runs on roller bearings (not shown) of non-magnetic material.

The annular member 4 has, at its periphery a shoulder 43 in which the ring 3 nests. At its inner periphery, the member 4 has an annular axial projection 44 onto which the ring 2 fits. In this way the rings 2 and 3 are held coaxially with the axis 1. The rings 2, 3 and 4 are clamped between the flange 51 and a retainer ring 7. The retainer ring 7 is secured to the hub 5 by means of screws (not shown) which are spaced from the screws 61. To replace the rings 2 and 3 it is sufficient to unscrew the screws which are not shown (while maintaining the inflow of cooling medium) and to remove the retainer ring 7, whereupon new rings 2 and 3 may be readily placed in position and secured by screwing on the retainer ring.

Guide pins (of which only one is shown and is designated by the reference numeral 8) prevent rotation of the rings 2 and 3 relatively to the hub. The pin 8 is disposed in a bore in the annular member 4 and engages a groove in the ring 3. The ring 2 is held by static friction against the rings 3, 4 and 7, but may be further secured against relative rotation by means of pins (not shown).

The rings 4 and 7, the hub 5 and the annulus 6 are of non-magnetic material.

In the above-described embodiment, the annular member 4 is directly connected to the flange 51 of the hub 5, by means of which it is indirectly connected to the marginal part of the annulus 6 forming a flange of the driving shaft. In an alternative embodiment (not illustrated) a part corresponding to the annular member 4 (that is, a part adjacent the ring of electrode material and having an annular cooling duct in its surface adjacent said ring) is itself a flange of the shaft or of a hub.

As can be seen, the rings 2 and 3 of the present contact roller, which are subject to wear, may be rapidly and simply replaced.

What is claimed is:
1. A contact roller for a seam welding machine comprising:
   a rolling surface formed by the peripheral surfaces of a pair of rings the first ring being of electrically conductive electrode material and the second ring being of a material conducting substantially no welding current; and
   an annular member abutting a surface of said ring and having an annular groove in the surface abutting said first ring of electrode material, said groove together with the surface of said first ring defining a cooling duct for cooling said first ring and said annular member holding said second ring against said first ring.

2. A contact roller as claimed in claim 1 and having a shaft or hub, characterised in that said annular member is a flange of the shaft or of the hub.

3. A contact roller as claimed in claim 1, and having a shaft or hub with a flange, characterised in that said annular member is a ring connected to the flange.

4. A contact roller as claimed in claim 1, characterised in that the roller contains a shaft or hub, and the ring of electrode material and the ring conducting substantially no welding current are held between said annular member and a retainer ring removably secured to said shaft or hub.

5. A contact roller as claimed in claim 4, characterised in that, at its outer periphery, the said annular member has a shoulder in which there rests part of the ring which conducts substantially no welding current, and at its inner periphery said annular member has an annular, axial projection onto which the ring of electrode material fits.

References Cited by the Examiner
UNITED STATES PATENTS

| | | | |
|---|---|---|---|
| 1,553,727 | 9/1925 | Sjobring et al. | 219—84 |
| 1,992,553 | 2/1935 | Sykes | 219—84 |
| 2,280,111 | 4/1942 | Widell | 219—84 |
| 2,510,744 | 6/1950 | Forssmark | 219—84 |
| 2,614,146 | 10/1952 | Mallet et al. | 219—84 |
| 2,625,639 | 1/1953 | Mallet et al. | 219—84 |
| 2,643,319 | 6/1953 | Williams et al. | 219—84 |

RICHARD M. WOOD, *Primary Examiner.*

ANTHONY BARTIS, *Examiner.*

B. STEIN, *Assistant Examiner.*